Patented Jan. 20, 1953

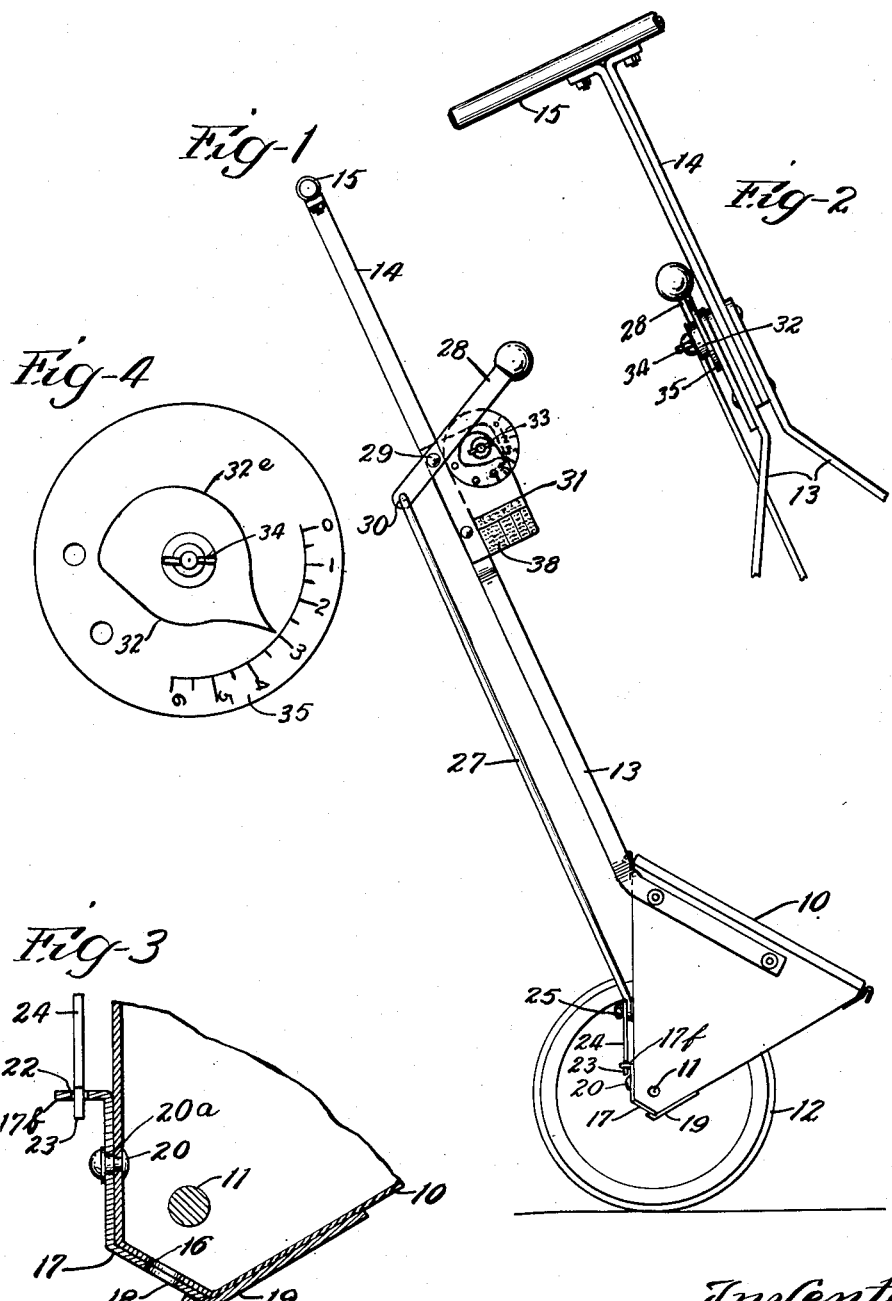

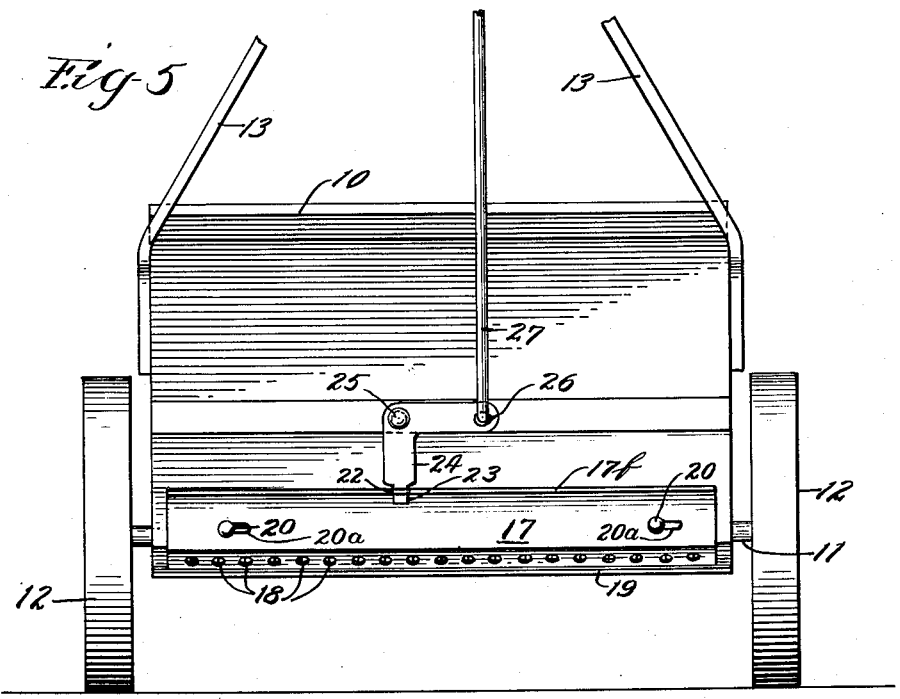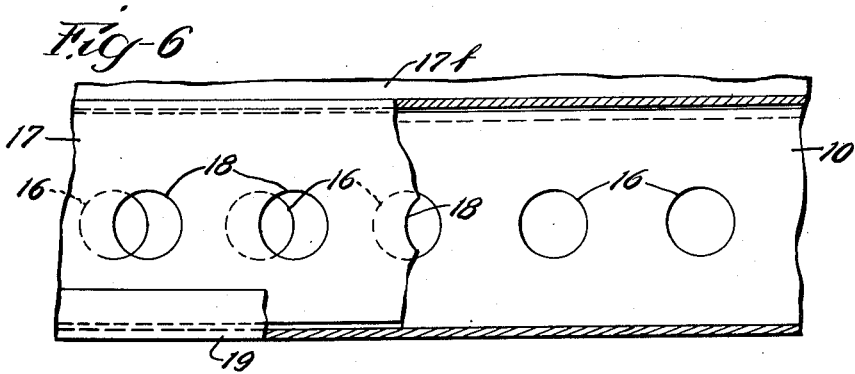

2,626,083

UNITED STATES PATENT OFFICE 2,626,083

CALIBRATED FERTILIZER SPREADER ADJUSTMENT

Edwin L. Masters, Benton Harbor, Mich.

Application August 20, 1949, Serial No. 111,504

7 Claims. (Cl. 222—48)

This invention relates to lawn spreaders designed to spread fertilizer, sand, seed and other materials used in the preparation and maintenance of lawn areas. Such spreaders are broadly old in the art and are normally equipped with effective agitators and distributor control mechanisms to permit the operator to adjust the discharge volume of the materials in spreading such materials over a predetermined area. However, the adjustment control for spreading fertilizers or other materials has commonly been placed at or near the bottom of the hopper of the spreader and the control was effected by the operator stopping the spreader and by visual observation in a stooped over position adjusting the spreader outlets as his judgment dictated.

With the higher cost of fertilizer, seeds, etc. the need for adjustments to accurately and scientifically treat the variable conditions of the area have been accentuated. There is a need for quicker, more accurate and scientifically specified distribution of the spread materials. Further, best results are obtained by accurately spreading the materials in the amounts specified.

One particular object of the present invention is to provide a spreader adjustment device located on the operating handle of the spreader in easy reach of the operator from his spreader operating position.

Another object of this invention is to provide a spreader adjustment device which is calibrated for various spreader volumes and which is quickly and conveniently adjustable by the operator from an upright operating position.

A still further object of this invention is to provide a manually adjustable and calibrated spreader device that will effectively set and maintain accurate spreader volume without the use of tools.

Other objects and advantages relating to the present invention will be disclosed in the following description having reference to the accompanying drawings forming a part of this specification:

Fig. 1 is a side elevational view of my lawn spreader equipped with my calibrated adjustment device;

Fig. 2 is a fragmentary front view of the device shown in Fig. 1 to illustrate the details of the calibrated spreader adjustment device;

Fig. 3 is a fragmentary transverse sectional view of my adjustment device taken through the vertical leg of the bell crank;

Fig. 4 is an enlarged plan view of the distributor calibrating disc as will later be explained;

Fig. 5 is a fragmentary rear view of my spreader device showing the bell crank adjusting mechanism; and Fig. 6 is an enlarged fragmentary bottom view of the distributor plate to show the relationship of the distributor holes therein.

Now referring to the drawings and at the outset to Figs. 1, 2 and 3, I show a hopper 10 supported by a rotating cross shaft 11 bearing agitating mechanism and journalled in a pair of wheels 12. The hopper 10 carries dual handle brackets 13 riveted on a dual shank handle 14 attached to a hand bar 15 as shown. The bottom of the hopper 10 has circular discharge openings 16 which coact with a slidable distributor plate 17 having coacting circular discharge openings 18. The slidable distributor plate 17 is supported on its front edge by a cross strap 19 attached to the hopper 10, and by two studs 20 attached to the opposite side of the hopper extending through slots 20–a in the slide plate 17 whereby the slide plate can be adjusted. The slide plate 17 has a right angle bend 17–f in its top having an aperture 22. One arm of a bell crank lever 24 pivoted at 25 on the hopper extends into said aperture 22 whereby the rocking movement of the bell crank lever will adjust the slide plate. The other arm of the bell crank lever has an aperture 26 in which is hooked the lower end of a rod or link 27. The upper end of the link 27 is connected to the lower end of a lever 28 pivoted intermediate its ends upon the handle 14 as indicated at 29; the upper end of link 27 being hooked in an aperture 30 in the lower end of lever 28. Thus the weight arm of lever 28 is below the handle or pivot 29 while the power arm thereof is above the handle 14, as a result the extent of movement of the power arm will determine the extent of adjustment of the slide plate 17.

The spreader material flow adjustment means includes fine calibration mechanism carried upon the spreader handle in close proximity to the operator. This calibrated feed adjusting mechanism comprises a support plate 31 riveted or otherwise fastened to the handle 14 to carry the gauge means to control the feed of hopper materials. An indicia disc 35 is riveted or otherwise secured to the plate 31 and this disc displays the calibrations 0 to 6 with intermediate divisions as desired. A threaded stud 33 is connected with disc 35 to receive an apertured spreader feeding indicator 32 having a cam portion in the form of an edge 32e that is eccentrically arranged with respect to the mounting stud 33. Another edge portion of the indicator 32 comprises a pointer to cooperate with and to follow the spreader calibrations appearing along one peripheral portion of the face of the indicia disc 35 as best shown in Fig. 4. A wing nut 34 is screwed upon the threaded stud 33 and provides the securement means to fix the position of the indicator 32 in angular relation to disc 35 according to the selection of the feed position shown by the pointer on the indicator.

When the operator selects a given position of the indicator 32 in relation to the disc 35, the cam edge 32e presents a limit stop for the handle 28 as the latter is moved downwardly with its knob by the operator. This establishes a given material feed relationship through rod 27 and the slidable distributor plate 17 to carry out the feed flow desired. This action also causes lever 28 to frictionally bind against the face of the calibrated disc 25 to normally maintain the gauged relationship of the lever against the cam edge 32e of the indicator 32. Thus it will be apparent that the amount of distribution is controlled by the setting of the indicator 32. However, it will be apparent that the distribution can be shut off by the operator by pulling the lever 28 upwardly whereby the openings between the holes 16 and 18 are closed. It will, therefore, be apparent that the operator may proceed to make distribution of the material in accordance with his desires by the setting of the indicator 32. However, when making turns with the lawn spreader or if for any reason he desires to shut off the distribution of fertilizer and so forth, he may do so promptly by pulling up the lever 28.

Inasmuch as the calibrated disc 35 and the coacting indicator 32 are in plain sight and the operator has access to the handle 28, it will be understood and appreciated that the operator may adjust the effective openings between the holes 16 and 18 promptly and accurately as desired. When the adjustment has been made, the operator can set the adjustment by the thumb nut 34, and be assured that the distributor will spread materials in accordance with the desired volume indicated by the indicia markings on the disc 35. Thus I have provided a calibrated fertilizer spreader adjustment within easy access to the operator in operating position and thus the volume of the materials spread can be promptly and effectively controlled by the operator.

Having thus explained my invention, I now claim as new:

1. In a material distributing apparatus comprising a hopper having a handle and an adjustable slide plate for regulating the feed thereof, means for adjusting said slide plate a predetermined distance comprising a lever pivoted upon said handle, a connection between said slide plate and lever, a calibrated disc fastened to the handle and arranged in upright position with respect thereto and in a plane disposed parallel to the plane of operation of said lever, a cam member releasably mounted upon said calibrated disc and in the path of operation of said lever, said cam member presenting an edge portion thereof for contact by said lever to gauge the feed adjustment of the slide plate by said lever, and means on said cam member to coordinate the position of the latter with respect to the calibrations on said disc.

2. In a material distributing apparatus comprising a wheeled hopper having a handle extending upwardly for the operator and having an adjustable slide plate for regulating the material feed through said hopper, a calibrated disc mounted in upright position upon the upper side of said handle in view of the operator, a hand lever pivoted intermediate its ends upon the handle with its power arm above the handle and for swinging movement adjacent said disc and having its weight arm below said handle, a bell crank lever pivoted to said hopper and having one arm connected to said slide plate, a link connecting the other arm of said bell crank lever with the weight arm of said hand lever, and means for adjustably setting the amount of possible movement of said hand lever in a direction to regulate the material flow by said slide plate comprising a member mounted upon said calibrated disc and having a cam edge positioned in the path of movement of said lever, adjustable means to rotate said member upon said disc, and an indicator on said member cooperating with said calibrations on said disc to gauge the rotative adjustment of said member for a given material feed of the slide plate.

3. In a material distributing apparatus comprising a hopper having an upright handle and a shiftable slide plate for varying the feed from said hopper, means for controlling the shifting of said slide plate comprising a hand lever pivoted upon said upright handle for reach by the operator and having a connection with said slide plate for shifting the same, a calibrated gauge disc mounted in clear view of the operator upon said handle and adjacent the plane of the swinging movement of said hand lever and for surface contact by said lever, said disc including a cam means for varying the possible swinging movement of said lever in accordance with the feed desired to regulate said slide plate for a given material discharge, said lever being releasably maintained against said cam means by surface contact thereof with said calibrated gauge disc.

4. In a fertilizer spreader, a mobile hopper for discharging fertilizer adjacent the ground, valving means to regulate the feed of fertilizer from said hopper, an upright handle to guide said hopper and having a waist lever hand grip for an operator, and control means mounted upon said handle within easy reach of a standing operator and connected with said valving means to position the latter for obtaining a predetermined feed, said control means comprising a flat swingable lever arranged at one side of said handle and connected with said valving means to move the latter from full open to closed positions, and calibrated means secured to said handle to project upwardly therefrom and in a position to flank said lever, and an adjustable abutment member secured to one side of said calibrated means to limit the position of said lever and to control the feed of said valving means.

5. In a fertilizer spreader, a ground level mobile hopper for said fertilizer, valving means to regulate the feed of fertilizer from said hopper, a flat sided handle disposed in upright position to guide said hopper, and control means mounted upon the upper end portion of said handle and connected with said valving means to position the latter for obtaining a predetermined feed, said control means comprising a flat swingable lever connected with said valving means to move the latter from full open to closed positions, said flat lever being pivotally connected adjacent one flat side of said handle for up and down movement in a plane disposed fore and aft and in the line of travel of the hopper, and calibrated means interposed between the handle and said lever, said calibrated means comprising a flat calibrated plate member carried in an upright position upon said handle in a plane parallel to the plane of operation of said lever, and a rotationally adjustable cam releasably mounted upon a surface of said plate member and disposed for direct contact by said lever to limit the movement of the lever and to hold said valving means in a predetermined fertilizer feeding position.

6. In a fertilizer spreader, a mobile hopper containing said fertilizer, adjustable fertilizer feed mechanism for said hopper, a handle to guide said hopper and terminating with a transverse hand grip, and adjustable feed control means mounted upon said handle near said hand grip and connected with said feed mechanism to regulate the latter, said feed control means comprising a swingable member movable upwardly toward and downwardly away from said hand grip to operate said hopper feed mechanism between completely closed and completely open positions respectively, and adjustable means disposed in cooperative relationship beneath said member to provide an abutment to limit the free movement of said member in the material feed direction and to thereby provide a given limited position for said member by which said feed mechanism delivers a given quantity of fertilizer from said hopper, said adjustable means comprising a flat element secured to said handle and having a stud, a cam element releasably mounted for turning upon said stud and having a cam edge disposed in the path of movement of said swingable member, one of said elements having calibrations and the other element having a registering indicator thereon for cooperation with said calibrations to set said cam element in selected and predetermined positions to stop said swingable member for a given fertilizer feed by said feed mechanism.

7. In a fertilizer spreader, a mobile hopper containing said fertilizer, adjustable fertilizer feed mechanism for said hopper, a handle to guide said hopper and terminating in a hand grip, and adjustable feed control means carried by said handle near said hand grip and connected with said feed mechanism to regulate the latter, said feed control means comprising a hand lever swingably supported upon said handle in lateral offset relation with respect to the handle and within easy reach from said hand grip to close said feed mechanism when drawn toward said hand grip and to open said feed mechanism when actuated away from said hand grip, and an adjustable abutment member mounted in a lateral offset position upon said handle and in cooperative staggered relationship with respect to said lever to limit the opening of the hopper feed mechanism whereby a given feed is established, said feed mechanism being operable to closed position at any time by said lever by drawing the lever toward said hand grip.

EDWIN L. MASTERS.

REFERENCES CITED

The following references are of record in the file of this patent:

UNITED STATES PATENTS

| Number | Name | Date |
| --- | --- | --- |
| 373,585 | Ellwood et al. | Nov. 22, 1887 |
| 1,327,455 | Willis et al. | Jan. 6, 1920 |
| 1,912,988 | Masters | June 6, 1933 |
| 1,948,861 | Lindgren | Feb. 7, 1934 |
| 1,976,725 | Helm | Oct. 6, 1934 |
| 2,510,231 | Juzwiak | June 6, 1950 |